US005652145A

United States Patent [19]
Cody et al.

[11] Patent Number: 5,652,145
[45] Date of Patent: Jul. 29, 1997

[54] PASSIVE ACOUSTICS PROCESS TO MONITOR FEED INJECTION LINES OF A CATALYTIC CRACKER (LAW077)

[75] Inventors: George D. Cody, Princeton, N.J.; E. R. Elzinga, Jr., Marquette, Mich.; Charles L. Baker, Jr., Thornton, Pa.

[73] Assignee: Exxon Research and Engineering Company, Florham Park, N.J.

[21] Appl. No.: 577,657

[22] Filed: Dec. 22, 1995

[51] Int. Cl.⁶ .................................................. G01N 29/00
[52] U.S. Cl. ........................ 436/34; 436/37; 436/55; 422/62; 73/579; 73/602
[58] Field of Search .............................. 436/34, 37, 55; 422/105, 62; 73/579, 602

[56] References Cited

U.S. PATENT DOCUMENTS

| | | | |
|---|---|---|---|
| 3,012,848 | 12/1961 | Levey, Jr. et al. | 73/579 |
| 3,553,636 | 1/1971 | Baird | 73/584 |
| 4,357,603 | 11/1982 | Roach et al. | 73/861.21 |
| 4,824,016 | 4/1989 | Cody et al. | 239/8 |
| 5,022,266 | 6/1991 | Cody et al. | 73/579 |

*Primary Examiner*—Jeffrey Snay
*Attorney, Agent, or Firm*—Ronald D. Hantman

[57] ABSTRACT

The present invention is a method for non-intrusively monitoring the chemical and physical processes associated with gas generation in the feed riser of a cat-cracker and the correlation of those changes in these processes to changes in the output product produced the cat-cracker. The method includes the steps of measuring RMS accelerations along a feed riser at one or more positions, determining the initial RMS acceleration at each of these positions when the unit is operating at its desired performance, comparing the measured FRP to the reference FRP when said reactor is operating at its desired performance and determining the reference FRP, and determining the change in the FRP.

12 Claims, 9 Drawing Sheets

PASSIVE ACOUSTICS PROCESS TO MONITOR FEED INJECTION LINES OF A CATALYTIC CRACKER (LAW077)

BACKGROUND OF THE INVENTION

The present invention relates to a passive acoustics process to monitor the feed injection lines of a catalytic cracker.

The catalytic cracking of heavy oils to produce gasoline is widely accepted as the most important and widely used refinery process for converting heavy oils into more valuable gasoline and lighter products. Cracking can be defined as the breakdown of higher molecularweight hydrocarbons to lighter components by the application of heat. Cracking in the presence of a suitable catalyst produces an improvement in yield and quality over simple thermal cracking.

Catalytic cracking is a continuous fluid bed process where, at catalyst mass rates as high as 40 tons a minute, fresh catalyst is brought into contact with injected feed and subsequently separated as deactivated ("spent") catalyst from the gas stream of cracked hydrocarbons. This separation occurs in a fluidized bed reactor and stripper. The spent catalyst in then reactivated by oxidation of coke deposits in a fluid bed regenerator and returned to the injection zone as fresh catalyst.

The transfer of catalyst particles between the fluidized bed of the regenerator and other parts of the system is through transfer lines where the particles are transported in high velocity gas streams. The most important of these transfer lines from the viewpoint of feed conversion and product yield is the feed riser. In the feed riser initial contact is made between the fresh catalyst and an injected stream of oil and steam and a complex physical/chemical process takes place which produces large quantities of gas due to: (1) oil vaporization on the hot catalyst and (2) catalytic and thermal cracking of light hydrocarbons from the more complex hydrocarbons in the injected oil.

There are three sections of the feed riser ideally performing three critical functions:

An Initial Injection Zone where oil is introduced, contacts the circulating fresh catalyst and is vaporized. The design and performance of feed nozzles that inject the two phase mixture of oil and steam into the catalyst stream is critical for the performance of this section as is the density and uniformity of the catalyst particles.

An Intermediate Reaction Zone where the major part of the catalytic cracking reaction is carried out and whose function is to maintain good contact between feed and catalyst while avoiding excessive back mixing. A critical design parameter is the average catalyst velocity.

A Final Transport Zone which has the function of cracking the remaining convertible material without re-cracking valuable products (such as gasoline) that have been produced in the intermediate section.

Fluid bed catalytic cracking units (cat-crackers or FCCU's) are designed to run continuously over periods of many years between planned shut-downs for maintenance, design changes and repairs. Due to the large throughput of cat-crackers, even modest improvements in performance, if maintained through the run length, are converted into significant financial incentives.

The complex physical and chemical processes that take place in the various sections of the feed riser, present a significant obstacle in optimizing the yield and product distribution of the cat-cracking process against changes in the quantity and quality of the oil feed as well as changes in catalyst physical and chemical properties. In addition, changes in the performance of critical components such as feed nozzles and steam injection nozzles are difficult to detect. It is thus possible for the cat-cracker to operate at significant departures from "design" or "standard" conditions for extended periods of time. Therefore, there is a significant need for a real-time monitoring system that would alert the operator to departures of the process from optimum operating conditions and assist in optimizing conversion and yield of the incoming feed against changes in the operation of the unit.

Sampling of the cat-cracker output and on-line chemical analysis of the sample might appear to be the most direct route toward meeting this need. Unfortunately current limitations on analytical sensitivity and accuracy rule out sampling as an on-line monitor of cat-cracker conversion and yield vector.

Moreover, on-line extraction of a representative product from a working cat-cracker, even assuming significant improvements in analytic technology, does not meet the above need. An on-line extraction system would be intrusive and require penetration of the wall of the feed riser. The extraction probes would be subject to the harsh physical and chemical environment of the feed riser and could easily clog. Furthermore there is no assurance that the output of such a local probe would be representative of the "global" performance of the unit.

Local probes that give a global measure of the performance of a cat-cracker have been introduced. U.S. Pat. No. 4,650,566 and U.S. Pat. No. 4,808,383 describe the use of temperature probes to obtain uniform temperature distributions within the feed riser which correlate with improved unit performance. Such probes are not directly coupled to the catalytic cracking reaction, but rather to flow uniformities.

There thus remains a continuing need for a robust, non intrusive, on-line monitor of the cat-cracking reaction in the feed riser. The present invention satisfies this need.

SUMMARY OF THE INVENTION

The present invention is a method for non-intrusively monitoring the chemical and physical processes associated with gas generation in the feed riser of a cat-cracker and the correlation of those changes in these processes to changes in the output product produced the cat-cracker. It utilizes signal processing equipment to measure RMS acceleration of the feed riser wall at different locations along the length of the feed riser at a particular time. RMS acceleration, which means root mean square acceleration, is well known in the art, see U.S. Pat. No. 5,022,266. The measurements of the RMS wall accelerations at different places along the feed riser is used to define a feed riser profile (FRP), which may change with time (FRP(t)). The FRP is a set of RMS wall acceleration which can be directly correlated with the conversion of injected oil to lighter and more valuable products because these accelerations are related to the gas generation at the locations where the measurements take place. This system and method can be used as an on-line monitor of the performance of the injection and reaction zone of the fluid bed catalytic cracking unit. Changes in the RMS measurements may be used to alert the operator that the catalytic cracking unit is not operating at its optimum performance.

The method includes the steps of measuring RMS accelerations along a feed riser at one or more positions, determining the initial RMS acceleration at each of these positions when the unit is operating at its desired performance, comparing the measured FRP to the reference FRP when said reactor is operating at its desired performance and determining the reference FRP, and determining the change in the FRP. The operator may then change the operating parameters of the reactor so as to restore the FRP back to the initial values.

The reference FRP may be determined from the same reactor at an earlier time when the reactor is operating at its desired performance. Alternately, the reference FRP may be determined from a similar reactor.

DESCRIPTION OF THE PREFERRED EMBODIMENT

The present invention is a process for the non-intrusive measurement and monitoring of the set of RMS accelerations which is denoted the feed riser profile, FRP, produced by the impact of solid particles against the riser wall during cracking of injected feed along the length of the cat-cracking feed riser. The invention supplies on-line data which can be directly correlated with the conversion of injected oil to lighter and more valuable products and hence can be used as an on-line monitor of the performance of the injection and reaction zone of the fluid bed catalytic cracking unit, and as a system for alerting the unit operator should the data indicate that the unit is not operating at its optimal conversion and yield. The process is intended to assist the operators of such units to optimize the performance of the unit and maintain the unit at its optimum point with respect to unanticipated changes in a critical component, in changes in feed oil, or in changes in catalyst.

Figure 1:
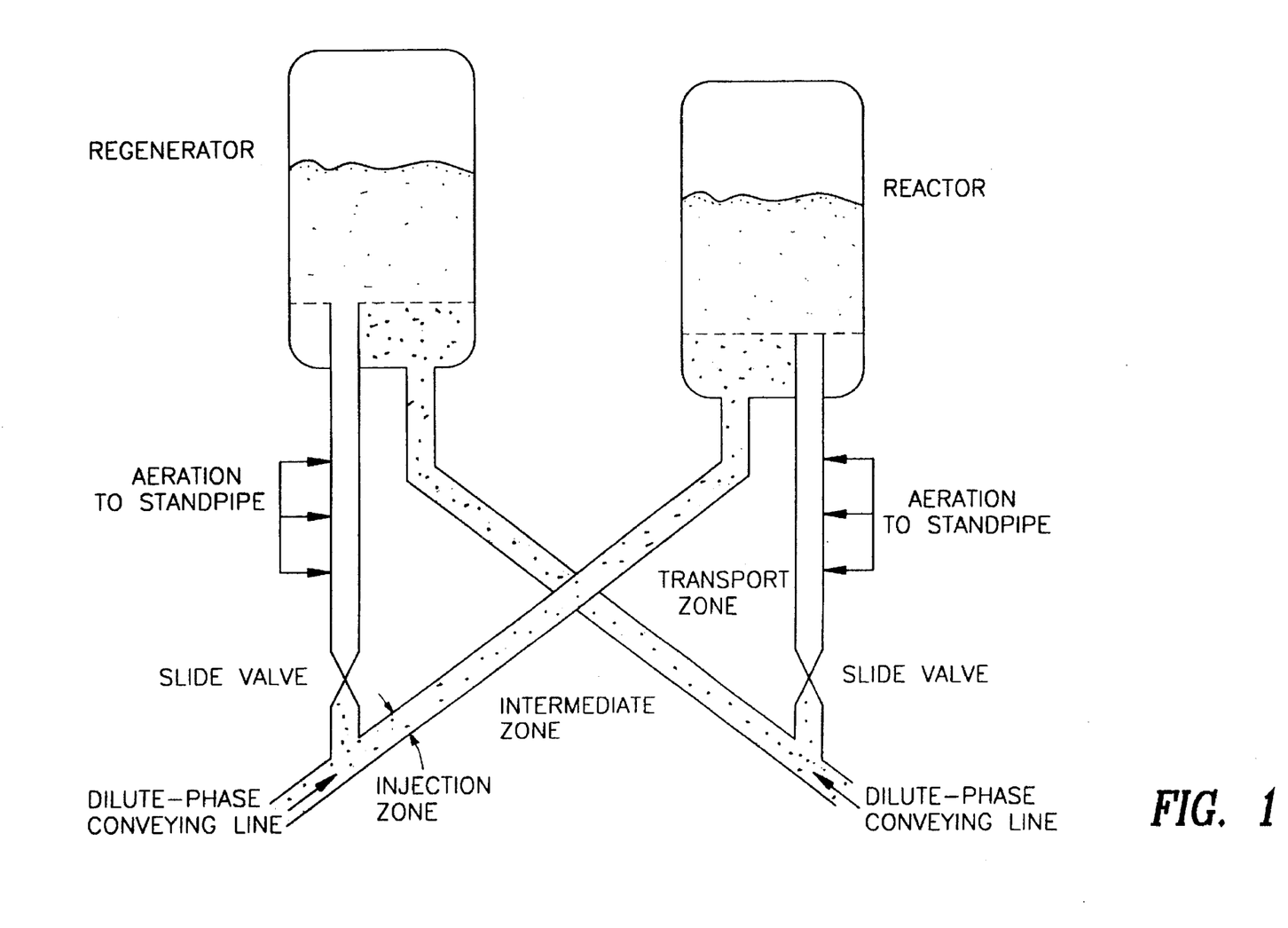
FIG. 1 shows a schematic of a fluidized bed catalytic cracking unit in which the injection zones of the feed risers are indicated.

FIG. 1 shows a schematic of a catalytic cracking unit. Catalyst and injected oil are combined in the feed riser.

Figure 3:
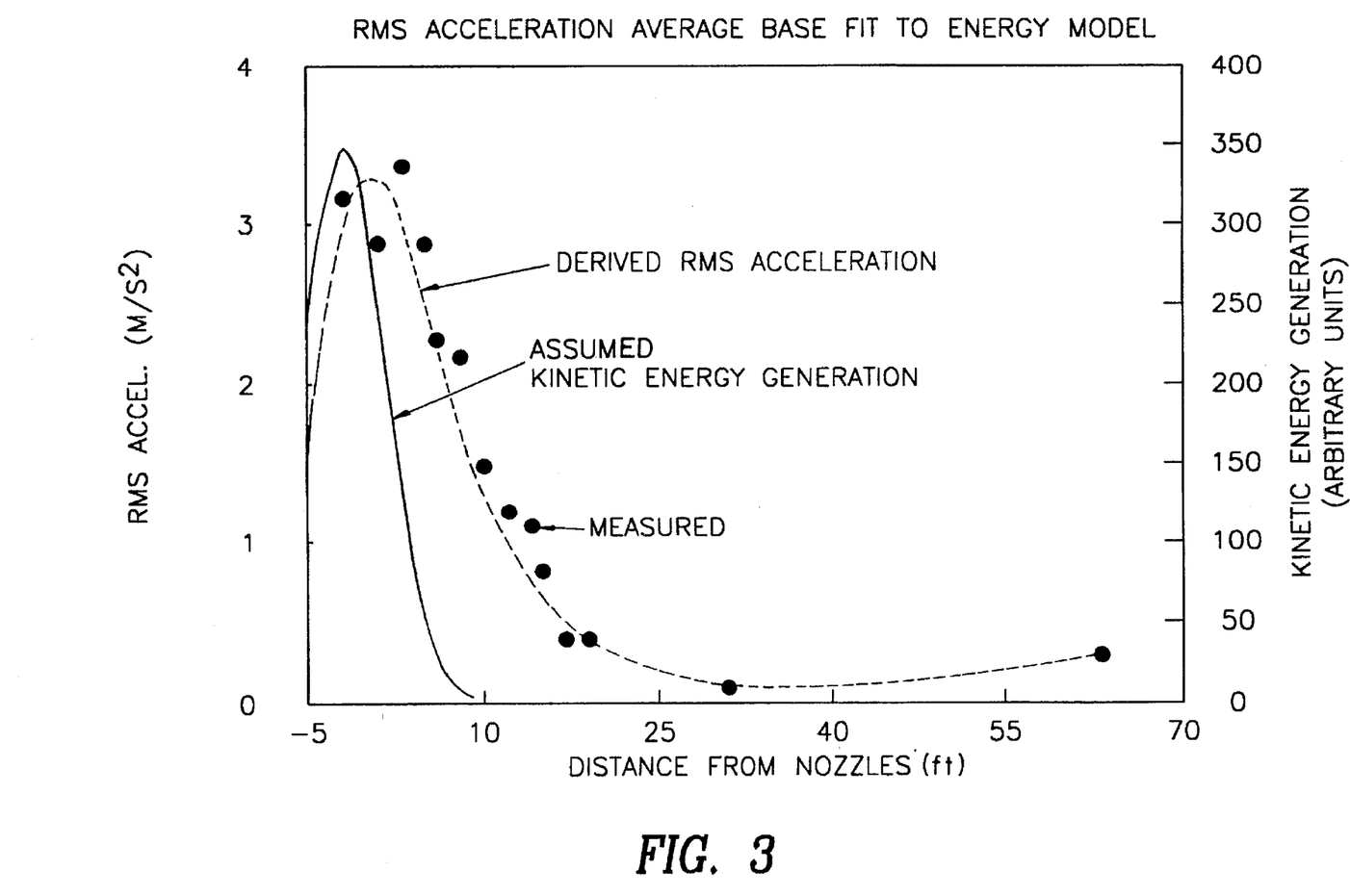
FIG. 3 shows both the measured profile of RMS acceleration along the feed riser and the predicted profile derived from an assumed profile of particle kinetic energy generation along the feed riser.

The reaction between the catalyst particles, injected oil, and steam generates gas. The gas increases the kinetic energy of the catalyst particles which lose energy by impact with each other and the walls. The random impact of particles against the riser walls increases the vibrational energy of the wall which is measured by an array of accelerometers attached to the outside wall of the feed riser. FIG. 3 shows a comparison of an assumed model for kinetic energy generation within the riser and the estimated axial particle energy at the wall of the feed riser, and the measured RMS acceleration.

Figure 2:
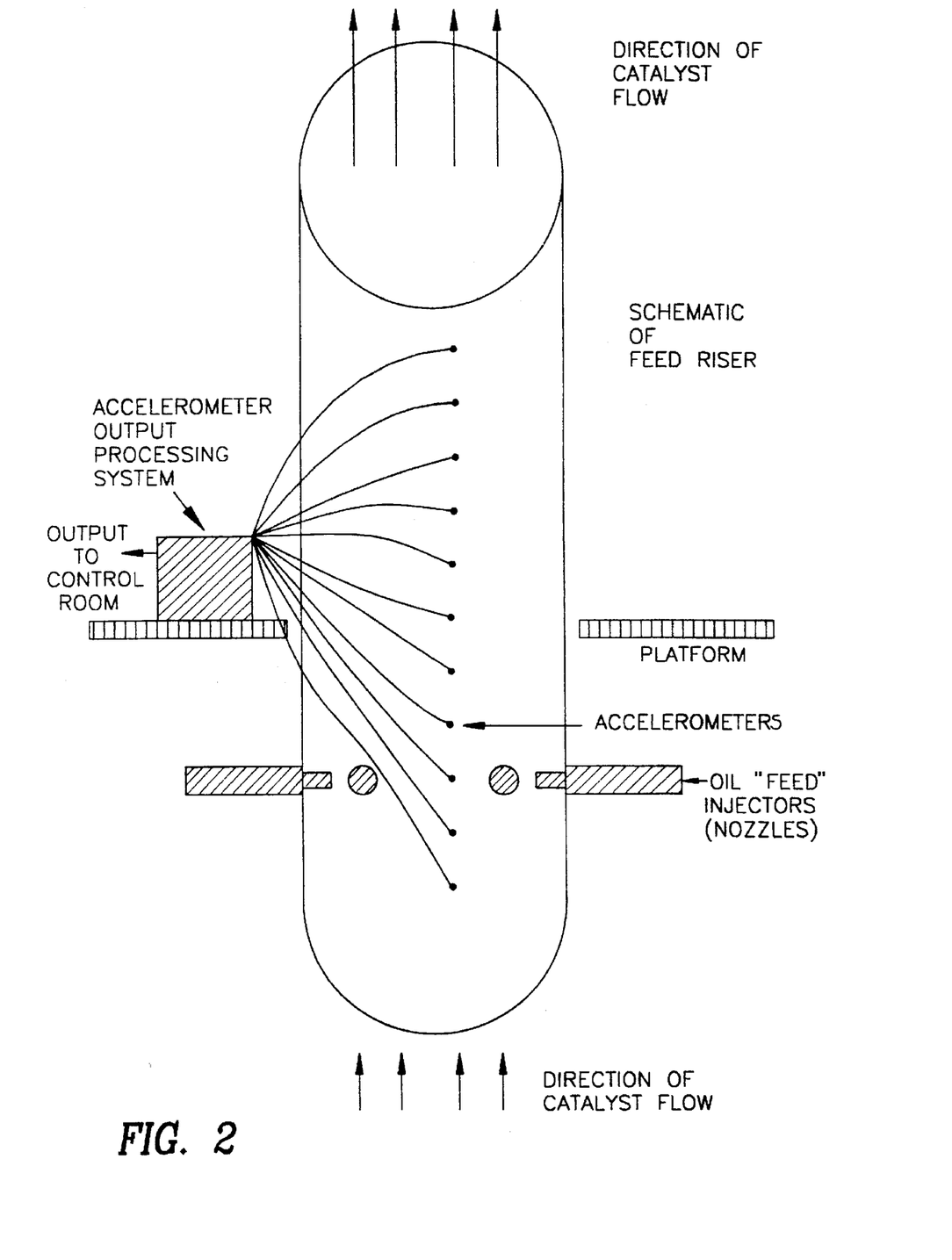
FIG. 2 shows a schematic of the relative positions of the accelerometers along the feed riser.

A number of accelerometers (for example a Bruel and Kjaer 4384) are attached to the external wall of the feed riser from a location about 10 feet downstream of feed injection to a location 25 to 50 feet down stream of feed injection (see FIG. 2). Inside this dimension about 8 accelerometer locations are chosen by examining the output of a magnetically attached accelerometer excited by an impact hammer (B & K 8202). Each accelerometer is at a specific axial distance from the feed injection point. The average RMS accelerations of each accelerometer at the location $Z_i$ from the oil injection point at time, t, is defined as $A(t,Z_i)$.

The set of values $A(t,Z_i)$ along the feed riser, $A(t,Z_i)$, $A(t, Z_2)$, . . . , $A(t,Z_n)$, correspond to "N" measurement locations is defined as the Feed Riser Profile, FRP(t) at time, t.

The generation of particle kinetic energy due to gas generation, and dissipation of that particle kinetic energy through inelastic collisions lead suggests that the FRP(t) should display a maximum downstream of the point of feed injection corresponding to the effect of isotropic gas generation on the particle kinetic energy at the wall due to feed vaporization and cracking. The FRP(t) will fall to a minimum value as gas generation falls off and then rise gradually as gas flow is channeled into increasing axial particle velocity. These general qualitative features of the FRP(t) have been observed for a variety of FCCU feed risers of different designs.

Shifts in the position and width of the maximum value of FRP(t) have been found to be strongly correlated with the performance of the fluid bed cat-cracker. It has been found empirically that changes in FRP(t) which increase the magnitude of the maximum, and move it forward of the injection point, tend to move the unit into operations conducive to improved yields of desired products.

In FIG. 2 we indicate an arrangement of accelerometers and processing and computing units on the platform of the unit that convert the approximately 8 outputs of the accelerometers to a determination of the unit performance described below.

The output of each accelerometer is processed over a frequency band of width 2B centered on a central frequency, $f_c$. The central frequency and bandwidth, 2B, are chosen from an examination of the acceleration power spectra of the wall at the locations in question on the basis of the following criteria: (1) to include the localized wall resonance if it is a feature of the refractory steel wall in question; (2) to exclude extraneous sources of wall vibrational energy that are not associated with random catalyst particle impact; (3) to exclude spurious resonances such as mounting resonances of the accelerometer.

After processing, the mean square acceleration at the time $t_1$ is determined and the square root of that quantity, which defines the RMS acceleration of the accelerometer in question, is obtained.

The measurements are repeated at later time interval, $t_2$. In this way a set of values of the RMS acceleration, $A(t,z_i)$, for each location, $z_i$, at time t, is obtained which is the FRP(t).

The FRP(t), which are the values of $A(t, z_i)$, may be fit to a continuous function in z at time, t.

The following expression which contains five parameters has been found to well approximate the available data:

$$A(t,z_i)=C_1[exp(-[(z-C_2)/C_3]^2)+C_4+C_5z]^{3/2}$$

The above equation has five constants. The first three represent a gaussian dependence of particle kinetic energy with position along the feed riser due to gas generation from catalytic and thermal cracking and volatilization. The last two constants represent the conversion of isotropic gas generation to axial flow. It has been found in practice that the constants $C_1$–$C_3$ are the most sensitive to characterizing the output of the injection and reaction zones, and the constants $C_4$ and $C_5$ provide useful information about the transport zone.

The operator of the unit may follow the change in unit performance by following the change in the FRP(t) or the changes in the five constants, $C_1$ to $C_5$ which make up the fit to the FRP(t).

In one embodiment of the invention, the electrical output of an array of accelerometers permanently mounted on the feed riser of a fluidized bed catalytic cracking unit is signal processed at the site to produce the FRP(t). The FRP(t) is fit to simple mathematical models and the magnitude of the fitting parameters transmitted to the control room of the catalytic cracking unit. In the control unit, a time average of the FRP(t) over a specified time interval is displayed as a reference ($FRP_{ref}$) as well as FRP(t) at later times.

Three modes of operation of the unit are possible given the real time information on gas generation along the length of the feed riser in FRP(t) as compared to $FRP_{ref}$:

(1) The real time on-line FRP(t) is maintained constant by a variety of operating controls available to the operator of the unit for an extended length of time to establish the base performance of the unit by usual analytic techniques product yield and product distribution. The reference performance $FRP_{ref}$ is stored and compared with FRP(t) obtained subsequently. Operating controls are kept within an "error band" of $FRP_{ref}$ chosen by the operator.

(2) The real time on-line FRP(t) is compared to an average, $<FRP_{ref}>$, obtained on FCCU units of similar design. Changes are made by the operator to bring FRP(t) into line with $<FRP_{ref}>$ of such units. Operating controls which are kept within an "error band" of $<FRP_{ref}>$ chosen by the operator.

(3) In another mode of operation, the reference FRP(t) is established by measuring conversion and yield with a dedicated on-line apparatus. This reference FRP(t) is stored and compared with subsequent FRP(t)'s.

The variety of controls available to the operator over the units performance are adjusted by the operator to change its magnitude and shape of the FRP(t)—for example to maximize or broaden the peak, move it forward of the injection point in order to return the FRP(t) to its reference value.

The FRP(t) can be maintained and restored by changes in a variety of parameters which are at the control of the operator. It should be noted that the change in some of these parameters induce change in others. Some examples are:

(1) Changes in feed temperature (pre-heat)
(2) Changes in gas injection ("catalyst gas lift", fluffing steam) prior to fuel injection
(3) Change in cat/oil ratio
(4) Changes in steam component of nozzles
(5) Change in feed nozzle injection pattern
(6) Change in coke composition on "fresh catalyst"
(7) Changes in catalyst The number of accelerometer locations required to define an FRP(t) that supplies useful process information to the operator depends on the unit and has to be determined empirically. As noted we have made the surprising discovery that the FRP(t) often exhibits gaussian dependence and can thus be approximated by a function that contains between 1 and 5 parameters, depending on the degree of accuracy. Thus 5 accelerometers covering three locations downstream of the peak and 2 upstream might be sufficient to determine a useful FRP(t).

The following examples show how a library for the FRP(t) for a given reactor may be determined.

EXAMPLE 1

This invention was used experimentally on the feed riser of a type A to show that the FRP is a stable characteristic of the feed riser that is well correlated with changes in feed riser performance due to routine process changes. The results of the tests appear in the first three rows of Table 1.

In this experiment wall acceleration measurements were made at 15 different locations along the feed riser and an FRP(t) was computed. The arrangement of the sensors is shown schematically in FIG. 2. Wall accelerations were measured with B&K model 4384 accelerometers and model 2635 charge amplifiers. All signals were simultaneously recorded by a RACAL multichannel tape recorder, and signal bandwidths were limited to the range of 6 to 10.9 KHz.

Measurements were made during normal feed riser operation to establish a reference FRP during a period of good feed conversion. Feed injection was made through the lower injector ring during this period. This FRP was fit to the following equation as described in the text above.

$$A(t,z)=C_1\{exp(-[(z-C_2/C_3]^2)+C_4+C_5z\}^{3/2}$$

The total feed conversion (normalized to 1.00) and the values of the fitting parameters are shown in the first row of Table 1 for the reference FRP.

Figure 4:
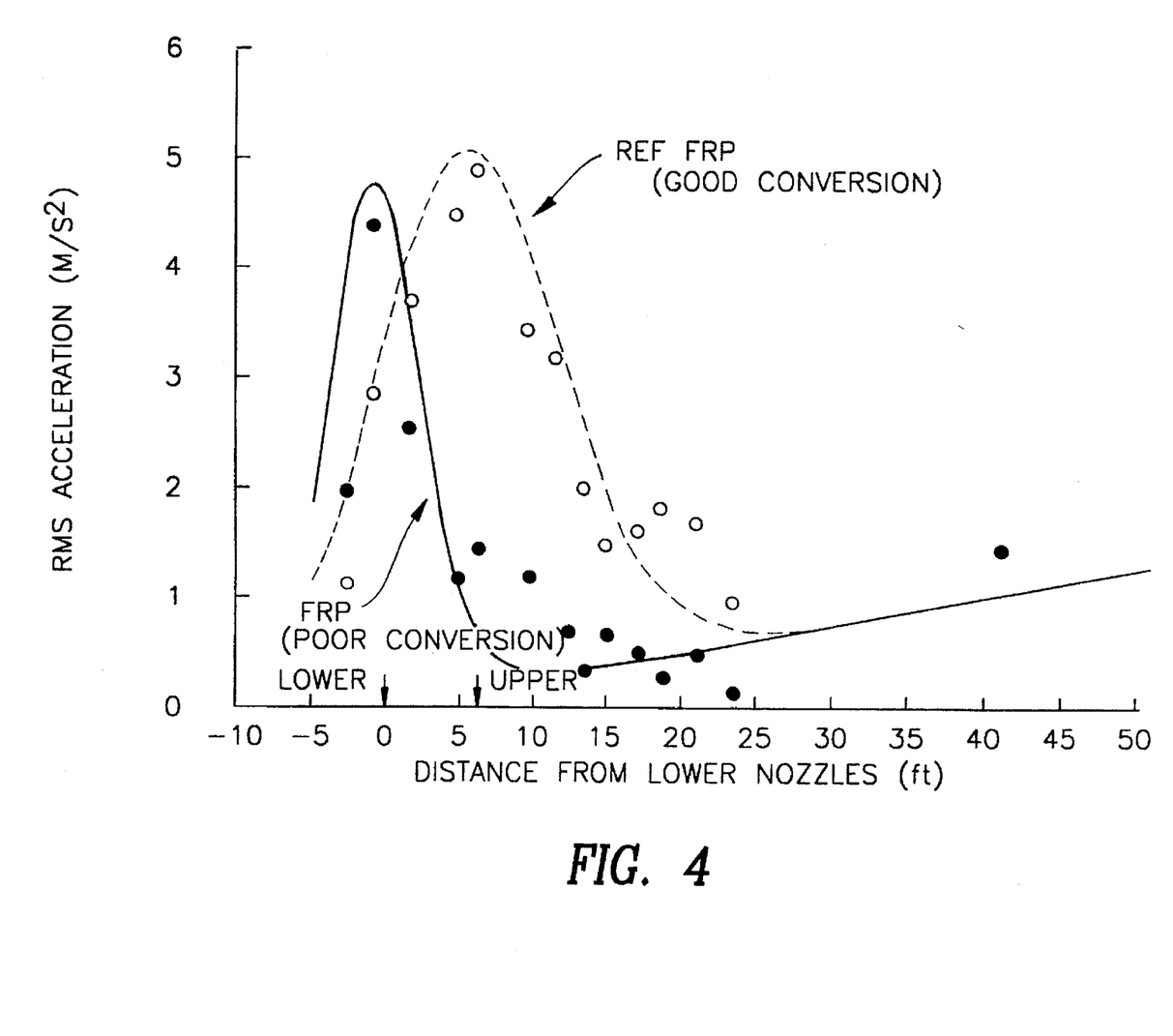
FIG. 4 shows the base case FRP indicating good conversion as well as the FRP obtained when feed conversion degraded.

A period of time later, the FCCU was observed to be operating in a less than optimal manner shown by a reduction of 1% in normalized feed conversion. The second row of Table 1 give the values of the fitting parameters for the FRP during this period, and FIG. 4 shows the base case FRP during good conversion as well as the FRP obtained when feed conversion degraded. FIG. 4 shows that the FRP changed dramatically in both character and magnitude. Wall acceleration peaks further upstream, resulting in marked changes to fitting parameters $C_1$ and $C_2$. The change in $C_1$ indicates that a shift in position of the gaussian part of the FRP has occurred, while the change in $C_3$ shows that a change in the width of the FRP occurred as well. The operator restored the FCCU to proper operation and good conversion by making adjustments to the feed riser injector rings. The relative amount of feed injected through the lower and upper injector rings is one of the controls available to the FCCU operator. After adjustment feed conversion was restored to a normalized value of 1.00 and the FRP returned to its reference profile. This test illustrates that changes in the FRP, which are reflected in changes in the fitting parameters shown in Table 1, are well correlated with changes in unit performance.

This FCCU is equipped with two types of feed injector nozzles, X and Y. The relative amount of feed injected into the feed riser through each injector nozzle is another control the FCCU operator can adjust in order to optimize operation of the unit.

After another period of time, the FCCU was again observed to be operating in a way that produced poor feed conversion. The nozzle configuration consisted of 2 X and 6 Y nozzles. The operator restored the FCCU to optimum operation by configuring the FCCU so that all the feed would be injected into the feed riser through the 8 type X nozzles.

Figure 5:
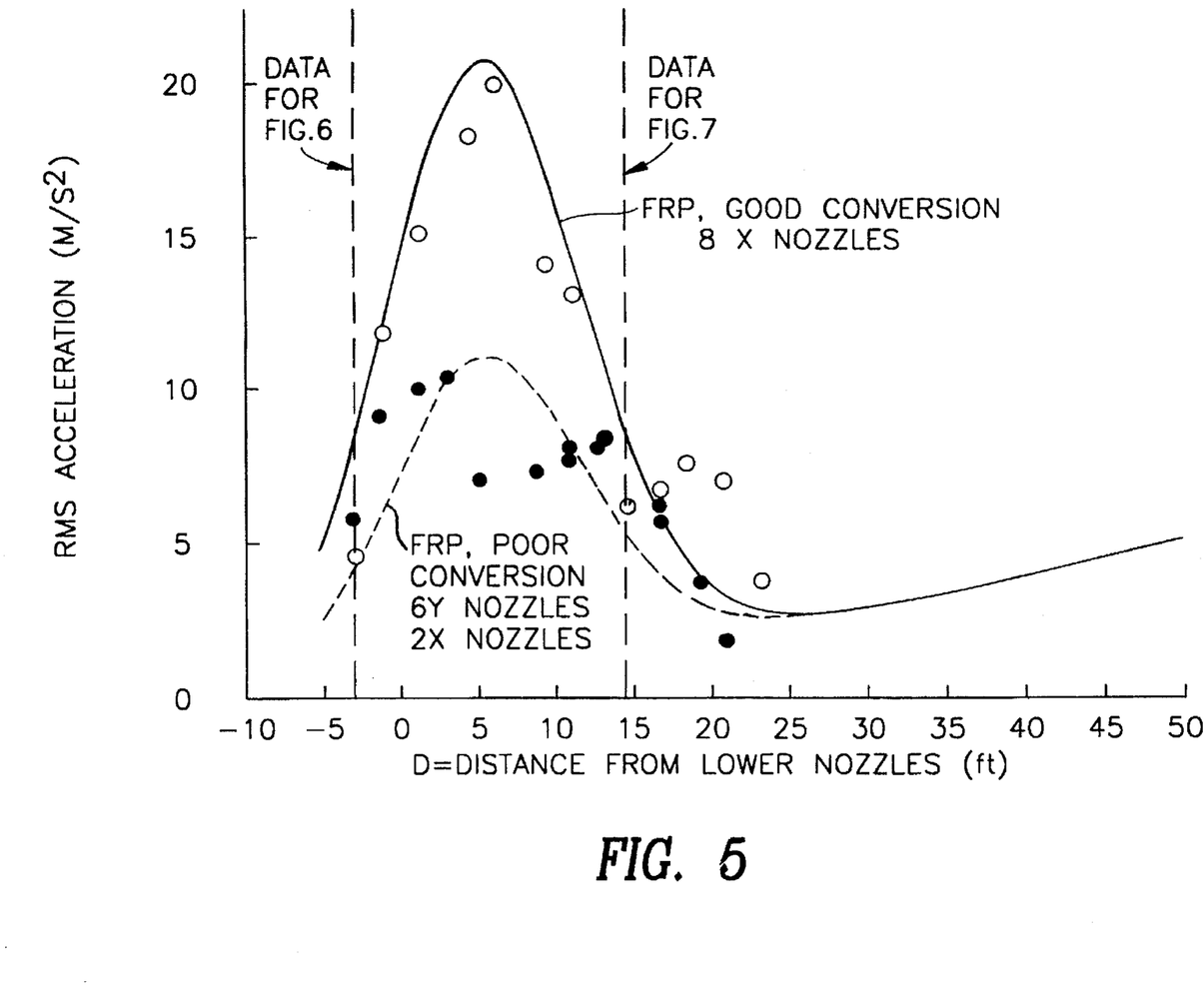
FIG. 5 displays the initial FRP with Y nozzles, and the reference FRP with X nozzles which for this unit is indicative of optimum feed conversion.

Adjustment of the FCCU in this manner caused the FCCU to return to its base case performance with a normalized feed conversion of 1.00. Further adjustment of the nozzles caused additional improvement in unit operation until normalized feed conversion reached a value of 1.05. FIG. 5 shows the values of the wall acceleration and FRP that is obtained in the case when injector nozzle configuration is adjusted for maximum normalized feed conversion compared with the reference FRP. The changes in the fitting parameters used to compute the FRP are shown in the third row of Table 1, which also shows the large change in feed conversion. A comparison between the first and third rows of Table 1 shows that the FRP fitting parameters are well correlated with normalized feed conversion.

EXAMPLE 2

In some cases measurement of the RMS acceleration at one location is sufficient to indicate changes in unit performance.

Figure 6:
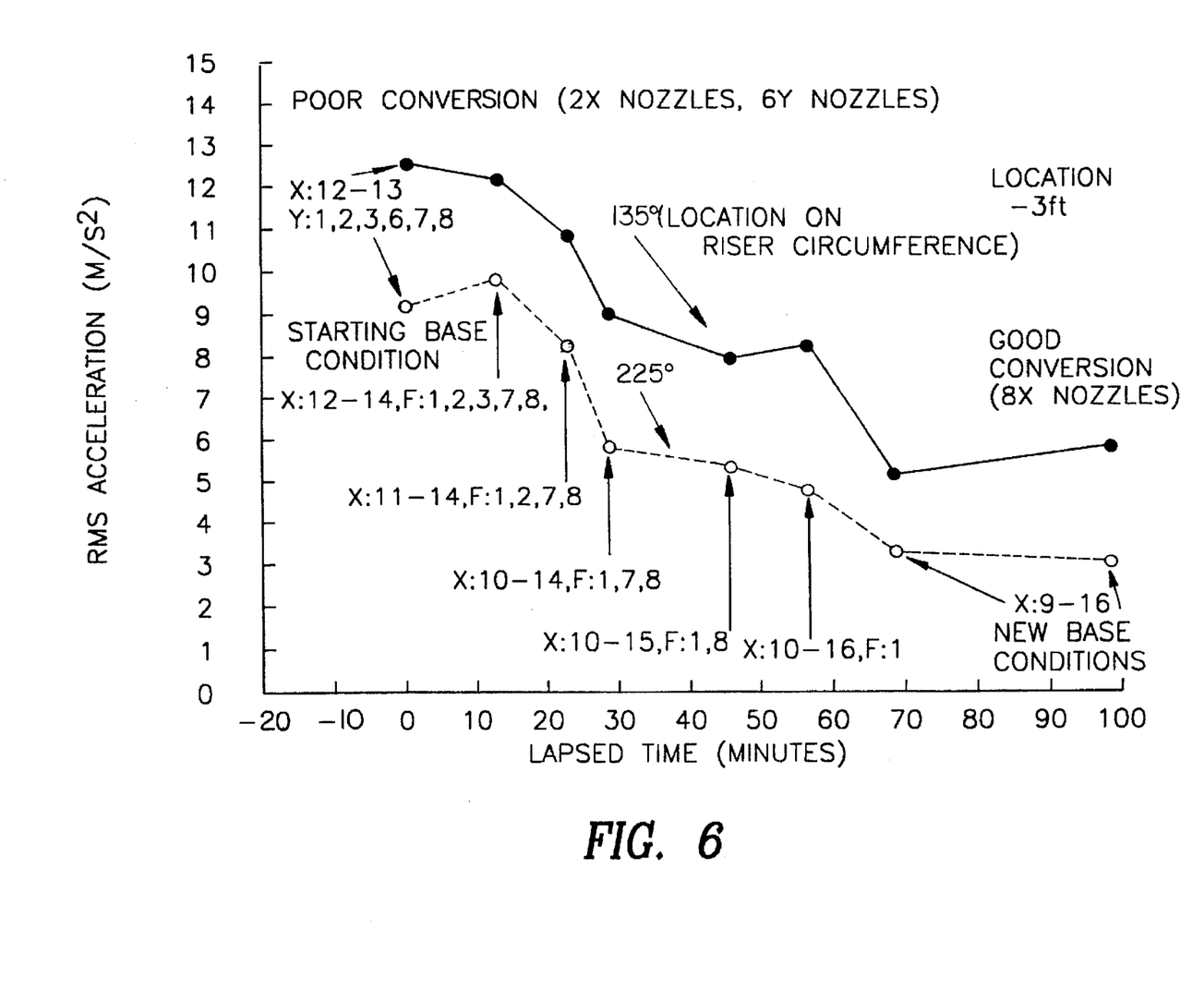
FIG. 6 shows how the wall acceleration 3 feet upstream of the injector ring changes when feed riser nozzles were changed from type X to type Y.
Figure 7:
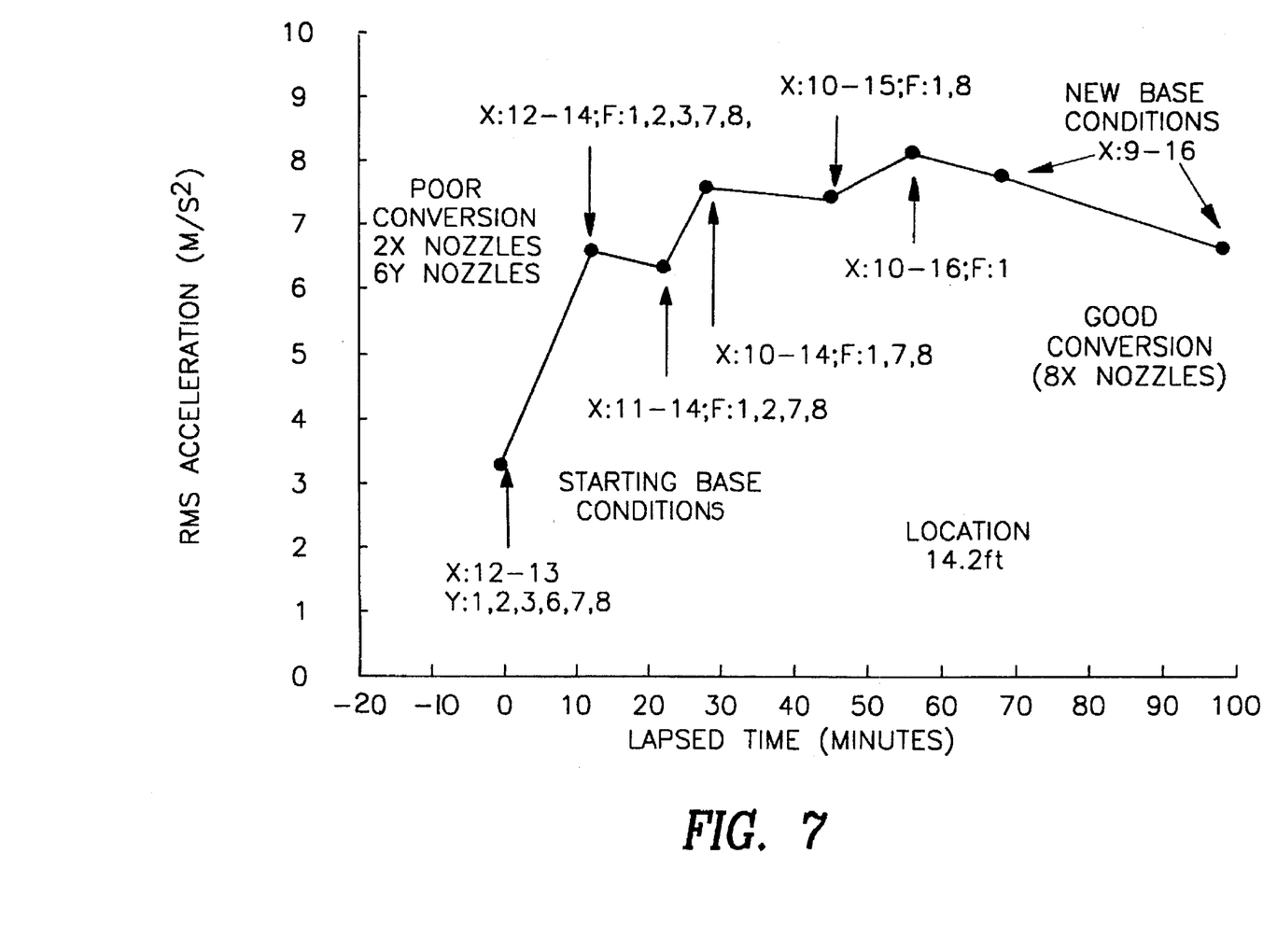
FIG. 7 shows how the wall acceleration 14.2 feet downstream of the injector ring changes when feed riser nozzles were changed from type X to type Y.

A reference FRP was established, by the method described above as mode 1, during a period of good feed conversion. A period of time later the FCCU was observed to be operating in such a way as to produce poor feed conversion. Measurement of the FRP fitting parameters permitted the operator to adjust the relative amount of feed injected through the two available nozzle types, X and Y, in such a way that the unit was brought back into proper operation as indicated by both measurements of product yield and by comparison of the resulting FRP fitting parameters with the reference FRP fitting parameters taken earlier. FIG. 6 shows how the measured wall acceleration changed 3 feet upstream of the type X nozzles during the time period in which the feed was changes from the 6 type Y+2 X nozzles to the 8 X nozzles. Inspection of FIG. 7 shows that the wall acceleration increase in magnitude 14.2 feet downstream of the type X nozzles for the change was accompanied by a reduction in wall acceleration of almost identical magnitude 3 feet upstream of the nozzles during the same time period of 70 minutes. The correlation between the wall acceleration at these positions and feed conversion shows that by carefully selecting the accelerometer position, the number of accelerometers can be reduced to as few as one or two.

Figure 8:
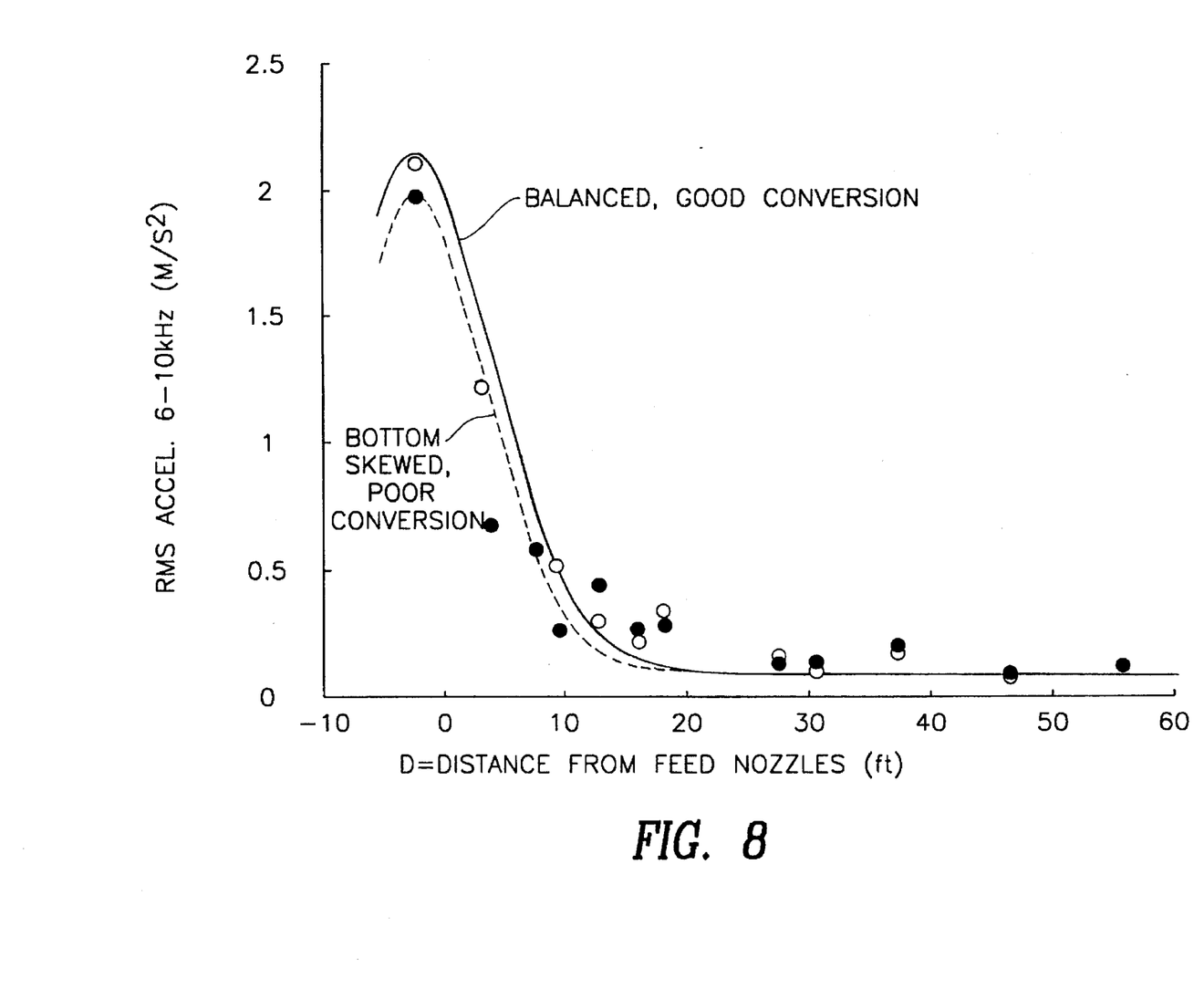
FIG. 8 shows the changes in the FRP that occurred when injector nozzle balance was adjusted.

Another example of the use of this invention is shown in FIG. 8. The invention was used to establish a reference FRP during a period of good conversion as measured by on-line product analysis. Row 4 of Table 1 contains the conversion obtained in the base case feed riser configuration, and the parameters used to generate the reference FRP fitting function.

Injector nozzle balance is another control the FCCU operator can use to optimize the unit's operation. Row 5 of Table 1 shows that the improvement in conversion that accrues when the injector nozzles are balanced is correlated with the changes in the FRP, in FIG. 8, and in the fitting parameters, row 6 of Table 1. Similarly, when the injectors were intentionally skewed the feed conversion deteriorated, and this effect is well correlated with changes in the FRP, FIG. 8, and in the fitting parameters, row 7 of Table 1. The dotted curve shows the RMS acceleration before adjustment of the nozzle balance and the solid curve shows the RMS acceleration after nozzle balance.

Figure 9:
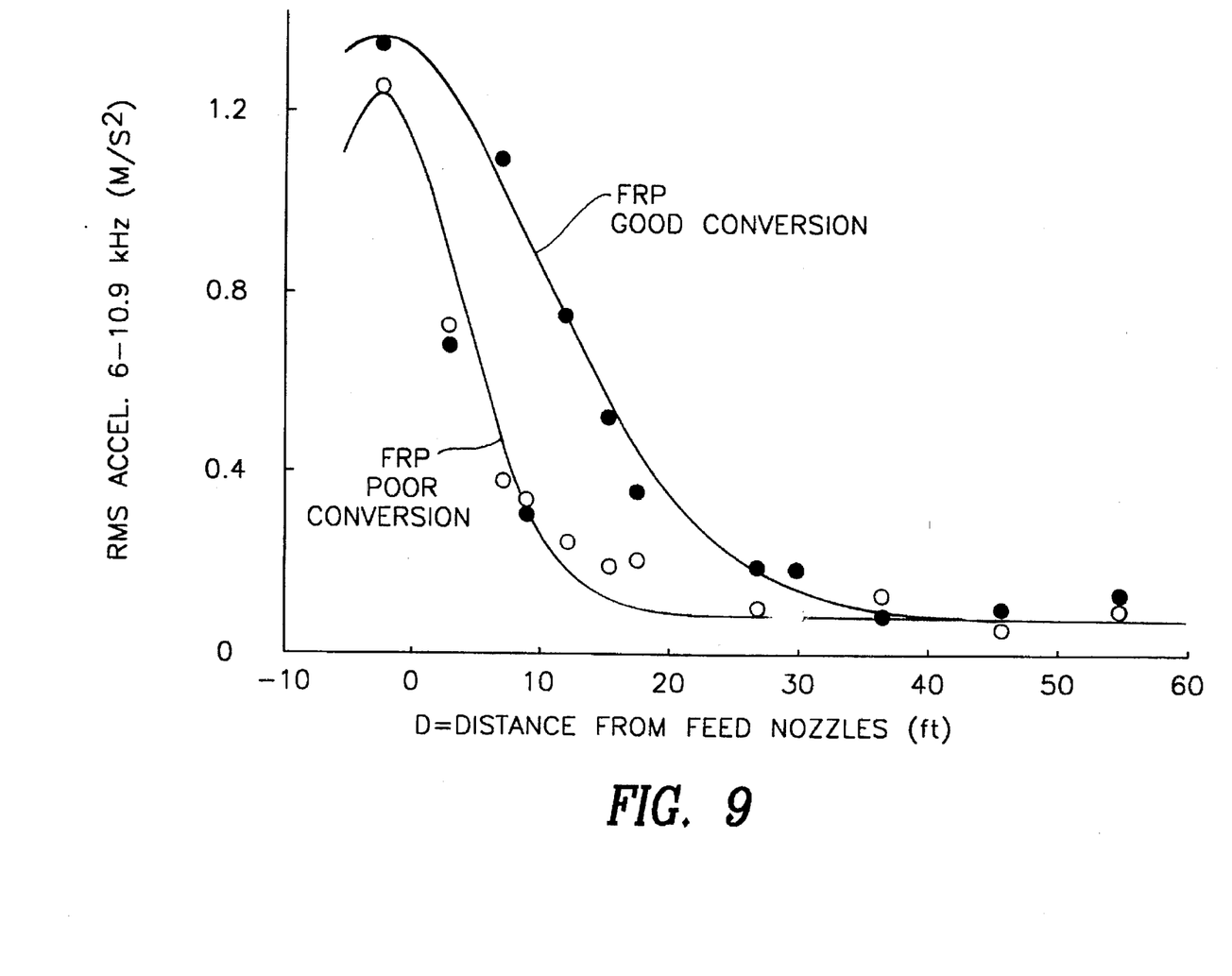
FIG. 9 shows the changes in the FRP that occurred when spent catalyst residence time was adjusted.

Spent catalyst residence time is another control available to an FCCU operator. Residence time conditions were held constant and then adjusted for a period of time so that the extent of the response of the FRP to this process change could be measured. FIG. 9 shows the reference FRP obtained for the FCCU in base case operation. Feed conversion, normalized to 1.00, and the FRP fitting parameters for the reference FRP are shown in row 4 of Table 1. A period of time later, the FCCU was observed to be operating with poor feed conversion. The FRP changed significantly from the reference FRP during this period.

The operator then adjusted the spent catalyst residence time in a way that caused the FCCU to produce a normalized feed conversion of 1.00. Further adjustment of the spent catalyst residence time caused the FCCU to exceed the base case conversion by 4%. Row 5 of Table 1 shows the FRP fitting parameters and the normalized feed conversion obtained under these conditions, and FIG. 9 shows the FRP computed from these parameters compared with the reference FRP. The circles show the RMS acceleration before adjustment of the spent catalyst residence time and solid dots show the RMS acceleration after adjustment of the spent catalyst residence time. A comparison between rows 4 and 5 of Table 1 shows that the changes in the FRP fitting parameters are well correlated with changes in the normalized feed conversion that occur when spent catalyst residence time is adjusted. This correlation demonstrates that this invention is an effective tool for use in the optimization of FCCU operation.

TABLE I

FRP AT UNITS "A" AND "B" PARAMETERIZED AS
$A(t, z) = C_1\{\exp(-[(z - C_2/C_3]^2) + C_4 + C_5 z\}^{3/2}$

| Unit | Date | Conv. Norm | C1 [M/s$^2$] | C$_2$ [ft] | C$_3$ [ft] | C$_4$ | $\frac{C_5}{C_4}$ [ft$^{-1}$] |
|---|---|---|---|---|---|---|---|
| A-Base | 5/29 | 1.00 | 17.0 | 5 | 10 | 0.105 | 0.07 |
| A-2 | 5/29 | 0.99 | 17.0 | −1 | 5 | 0.105 | 0.07 |
| A-3 | 6/10 | 1.05 | 7.88 | 5 | 10 | 0.174 | 0.07 |
| B-Base | 10/23 | 1.00 | 0.92 | −2 | 10 | 0.208 | 0 |
| B-2 | 10/23 | 1.04 | 1.03 | −2 | 20 | 0.192 | 0 |
| B-3 | 10/25 | 1.01 | 1.85 | −2 | 10 | 0.130 | 0 |
| B-4 | 10/25 | 0.95 | 1.68 | −2 | 9 | 0.139 | 0 |

What is claimed is:

1. A method for the monitoring of output of a catalytic reactor comprising:
(a) measuring wall vibrations along a feed riser at more than two positions, (b) determining RMS acceleration at each of said positions and generating a feed riser profile therefrom, (c) comparing said feed riser profile to a pre-determined initial feed riser profile obtained when said reactor is operating at the desired performance, to determine a change in reactor performance.

2. The method of claim 1 wherein said pre-determined feed riser profile was obtained from said reactor at an earlier time.

3. The method of claim 1 wherein said pre-determined feed riser profile was obtained from a similar reactor at an earlier time.

4. The method of claim 1 further comprising the step of changing the operating parameters of said reactor to bring it back to the initial feed riser profile.

5. The method of claim 1 wherein said operating parameters include feed temperature, gas injection, cat/oil ratio, gas superficial velocity, steam component of nozzles, feed nozzle injection pattern, coke composition on catalyst, and changes in catalyst.

6. The method of claim 5 wherein wall vibrations are measured at more than three positions and fit to a continuous function of position along the riser having four parameters.

7. The method of claim 5 wherein wall vibrations are measured at more than four positions and fit to a continuous function of position along the riser having five parameters.

8. The method of claim 5 wherein said continuous function is the sum of a Gaussian and a liner function raised to a power=3/2.

9. A method for monitoring the output of a catalytic reactor comprising:

(a) measuring wall vibrations along a feed riser at more than two positions, (b) determining an initial RMS acceleration at each of said positions when said reactor is operating at the desired performance and generating an initial feed riser profile therefrom, (c) determining a second RMS acceleration at each of said positions at a later time and generating a second feed riser profile therefrom, (d) changing the operating parameters of said reactor so as to bring the second feed riser profile back to the initial feed riser profile.

10. The method of claim 9 wherein wall vibrations are measured at more than three positions and fit to a continuous function of position along the riser having four parameters.

11. The method of claim 9 wherein wall vibrations are measured at more than four positions and fit to a continuous function of position along the riser having five parameters.

12. The method of claim 11 wherein said continuous function is the sum of a Gaussian and a linear function raised to a power=3/2.

* * * * *